Feb. 16, 1954     J. F. BAGLEY, JR     2,668,971

BRUSH

Filed Oct. 3, 1950

INVENTOR.
John F. Bagley, Jr.
BY Ross & Ross
Atty. & Agent

Patented Feb. 16, 1954

2,668,971

UNITED STATES PATENT OFFICE 2,668,971

BRUSH

John F. Bagley, Jr., South Hadley, Mass., assignor to Stanley Home Products, Inc., Westfield, Mass., a corporation of Massachusetts Application October 3, 1950, Serial No. 188,240

1 Claim. (Cl. 15—145)

My invention relates to improvements in brush manufacture and is directed more particularly to brushes of the type wherein bristles are gripped between relatively twisted wires forming a bristle support which is bent into the shape of a loop and the ends or tangs of the support are inserted in a handle.

The principal objects of the invention are directed to the provision of a brush so as to overcome the objections and disadvantages inherent with prior art brushes and prior methods of making the same.

It has been common practice to secure the ends or tangs of the bristle support in a hole of the handle by adhesives of various types. The objection is that the adhesives become brittle or are softened by heat during processing so that the tangs are subsequently released from their positions with the handles.

Too, the tangs have often been heated and inserted in relatively smaller holes in the handles which have been formed from plastics. The plastic is softened by the heat and it hardens when cool so as to grip the tangs. It has been found, however, that in a short time, the material of the plastic handle around the tangs develops cracks and checks. This is obviously objectionable and is believed to be due to the stresses and strains developed by and during the heating operation.

According to my present invention, the tangs are inserted in a socket which is provided in a handle having a key hole and a key therethrough. The key hole and key are accurately located on the handle with reference to the brush tangs which are inserted into the socket.

Where the handle is formed from the various plastics, the bristle support is secured therein without the heretofore necessary heating step which tends to impair the construction. There is the further advantage that the securement afforded thereby is more efficient than anything known in the prior art.

With the foregoing and various other novel features and advantages and objects of my invention as will become more apparent as the description proceeds, my invention consists in certain novel features of a construction as will be hereinafter more particularly pointed out in the claim hereunto annexed and more fully described and referred to in connection with the accompanying drawings wherein:

Figure 1:
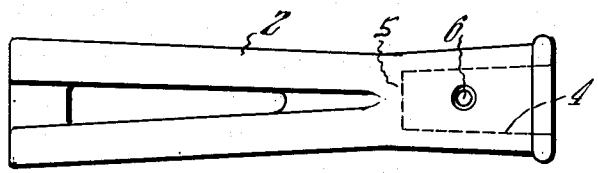
Fig. 1 is a plan view of a handle embodying the novel features of my invention.
Figure 2:
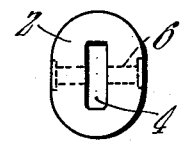
Fig. 2 is an end view of the handle shown in Fig. 1.
Figure 3:
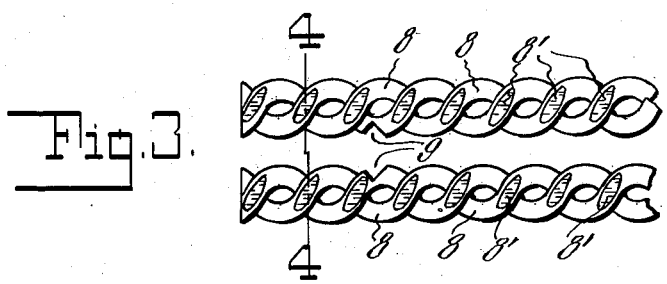
Fig. 3 is a plan view showing the brush tangs having a key hole therein.

Referring now to the drawings more in detail, in which similar characters of reference indicate corresponding parts in the several figures, and referring more particularly to the preferred form of my invention selected for illustrative purposes, I have shown a handle member 2 which may be formed of various materials.

For purposes of description, the handle member may be formed from a plastic material such as polystyrene.

One end of the handle member is provided with a socket 4 which is adapted for snugly receiving the tangs of a bristle support.

The socket is rectangular in cross section and has opposite and adjacent flat side walls extending forwardly from a bottom wall 5 to the said one end of the handle member. The side walls are angularly disposed relative to the longitudinal axis of the handle member.

The handle member is also provided with a key hole or opening 6 transversely therethrough and intersecting the socket 4. The key hole 6 is placed at a certain determined distance from the bottom wall 5.

The socket 4 and key hole 6 may be formed by any suitable means.

The key hole 6 extends transversely of the handle a certain determined distance from the bottom wall 5 of the socket 4.

The brush frame ends or tangs 8 comprise relatively twisted wires of the well known type. These twisted wires incorporate brush bristles therebetween and hold same securely in position.

A pair of the tangs are insertable into the socket 4 and the lower free ends thereof are in abutment with the bottom wall 5 of the socket.

Figure 4:
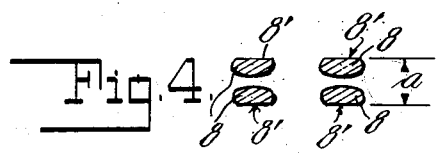
Fig. 4 is a sectional view along the line 4—4 of Fig. 3.

The upper and lower sides of the tangs are relatively flattened as at 8' so that the overall height or thickness of the tangs does not exceed a certain determined dimension $a$, as shown in Fig. 4. The dimension is not in excess of the distance between the upper and lower walls of the socket 4.

The upper and lower sides of the tangs, being flattened, are adapted to lie against opposite walls of the socket upon the insertion of the tangs thereinto.

Figure 5:
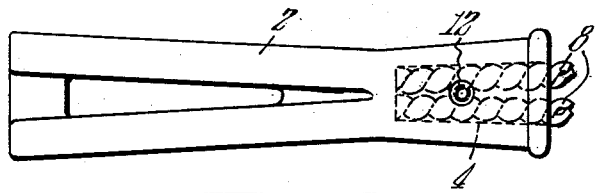
Fig. 5 is a plan view showing the tangs as secured in the handle.

The adjacent inner sides of the frame ends are each provided with recesses which are in alignment with each other so as to provide an opening 9 through the tangs when same are in the closed position, that is when the tang members of the pair are brought into tight adjacency as in Fig. 5. That is to say, the opening 9 is at a distance from the free ends of the tangs corresponding to the said certain distance of the key hole 6 from the bottom wall 5.

The recesses are placed in a predetermined position so that when the tangs are inserted into the socket of the handle, the opening 9 will be in alignment with the key hole 6 in the handle.

With the tangs 8 in adjacency in the socket 4 and with the opening through the tangs in alignment with the key hole in the handle so that the free ends of the tangs are in abutment with the bottom wall of the socket, a key represented by 12 is inserted into the key hole and through the opening.

The key may be formed of a rivet, pin or the like and serves as a securing member in that the tangs are urged outwardly whereby the sides thereof are urged tightly against the opposite side walls of the socket.

While the key holes are shown as for a round key, it will be appreciated that the same may be made for keys of any desired cross section.

While the novel features of the invention are adapted for handles of plastic material, it will be understood that they are equally applicable to handles formed from various other materials.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claim is therefore intended to be embraced therein.

What it is desired to claim and secure by Letters Patent of the United States is:

A brush construction comprising in combination, a handle provided with an open ended socket in one end thereof, the socket being rectangular in cross section and having opposite and adjacent flat side walls extending forwardly from a bottom wall to the one end of said handle, said handle being provided with an opening transversely therethrough and intersecting the socket, a pair of brush frame ends in the socket each including a pair of relatively twisted wires with the ends thereof in abutment with the bottom of the socket, upper and lower sides of the wires of said frame ends being flattened to lie against the opposite walls of the socket, adjacent inner sides of said frame ends provided with recesses in alignment with the opening in said handle, and means extending through the opening and recesses holding the frame ends in the socket.

JOHN F. BAGLEY, Jr.

References Cited in the file of this patent

UNITED STATES PATENTS

| Number | Name | Date |
| --- | --- | --- |
| 1,325,636 | Guy | Dec. 23, 1919 |
| 1,444,416 | Doty | Feb. 6, 1923 |
| 1,676,115 | Schwartz | July 3, 1928 |
| 1,807,434 | Redlinger | May 26, 1931 |
| 2,510,376 | Burch | June 6, 1950 |